Jan. 24, 1961 G. L. DE WOLF ET AL 2,969,473
CORDLESS ELECTRIC CLOCKS
Filed Dec. 31, 1958 5 Sheets-Sheet 1

Inventors:
George L. deWolf,
Ira A. Terry,
by Leonard J. Platt
Their Attorney.

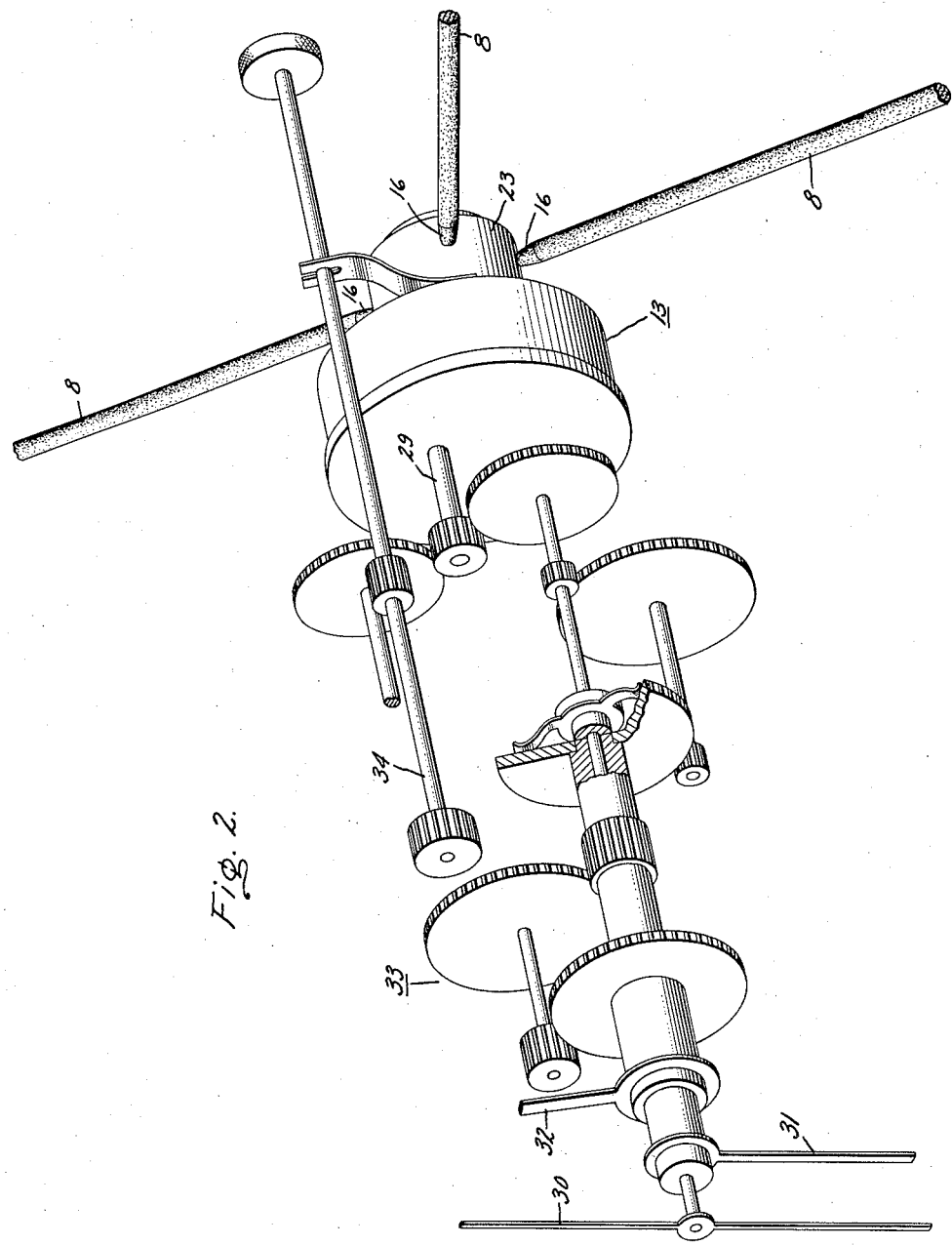

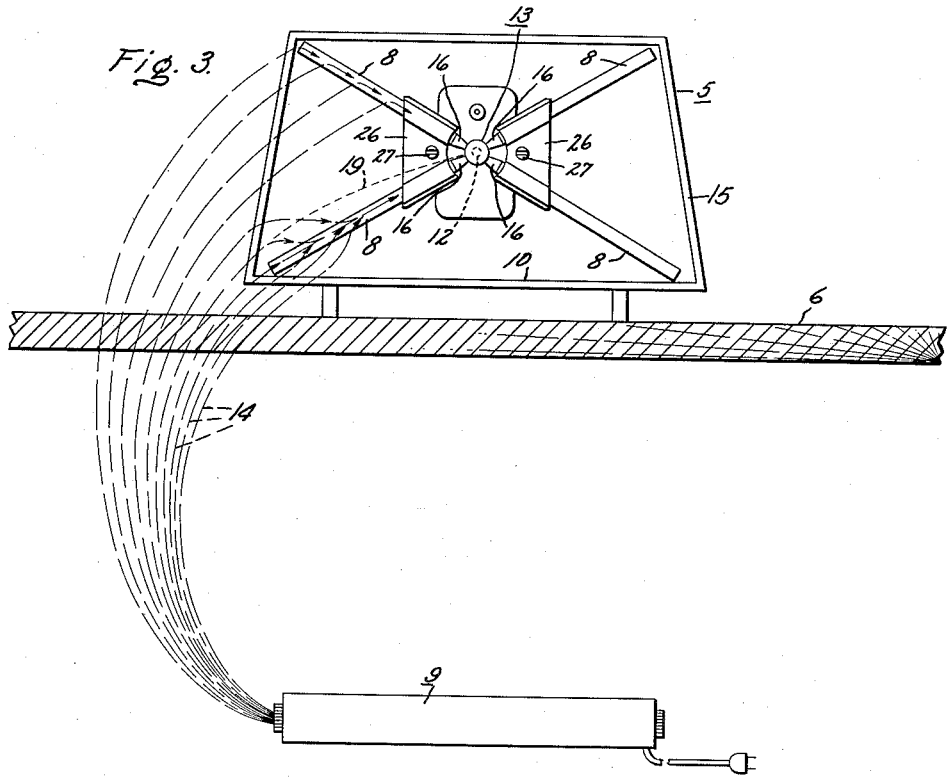
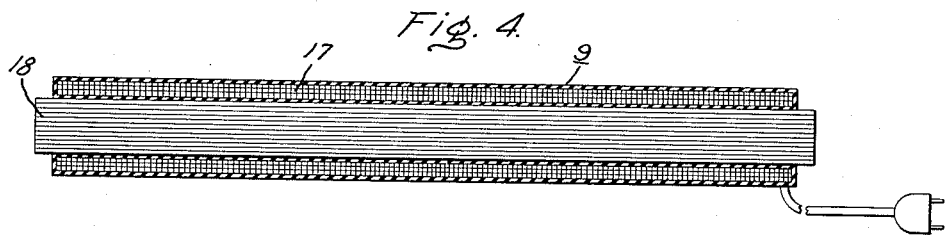

Jan. 24, 1961   G. L. DE WOLF ET AL   2,969,473
CORDLESS ELECTRIC CLOCKS
Filed Dec. 31, 1958   5 Sheets-Sheet 4
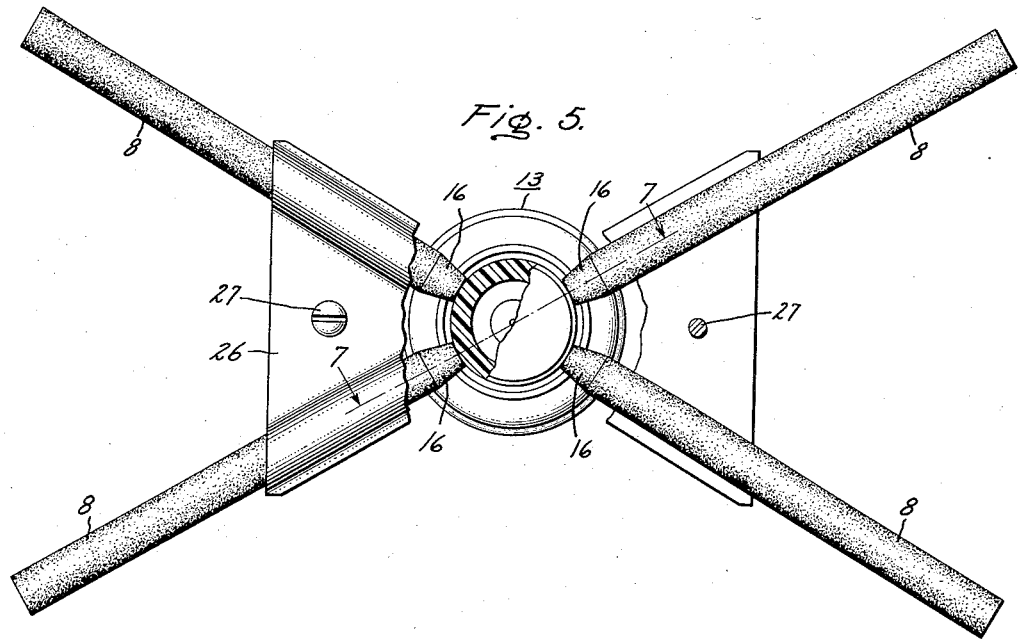
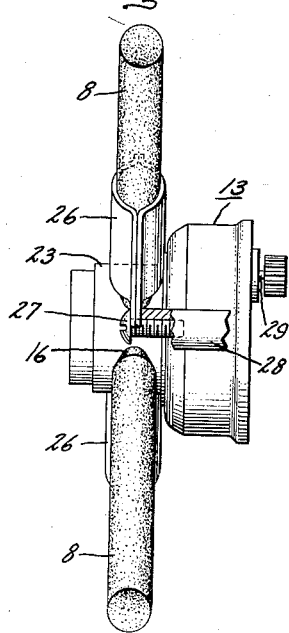
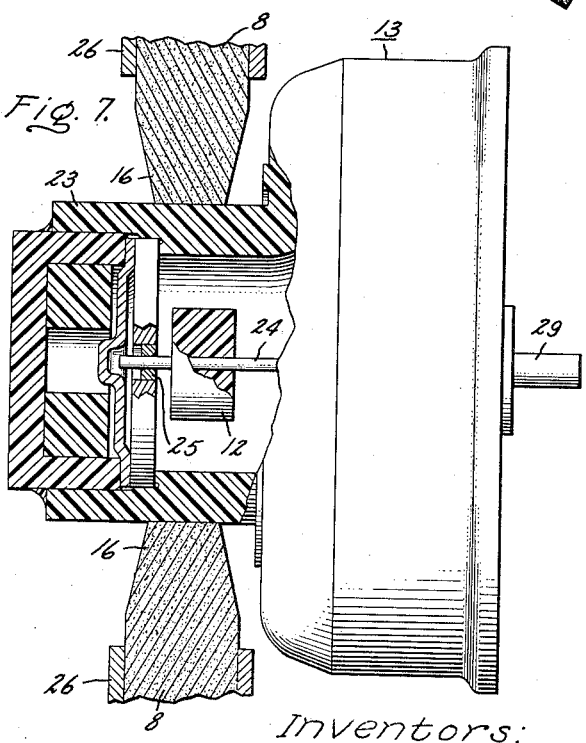
Inventors:
George L. deWolf,
Ira A. Terry,
by Leonard J. Platt
Their Attorney.

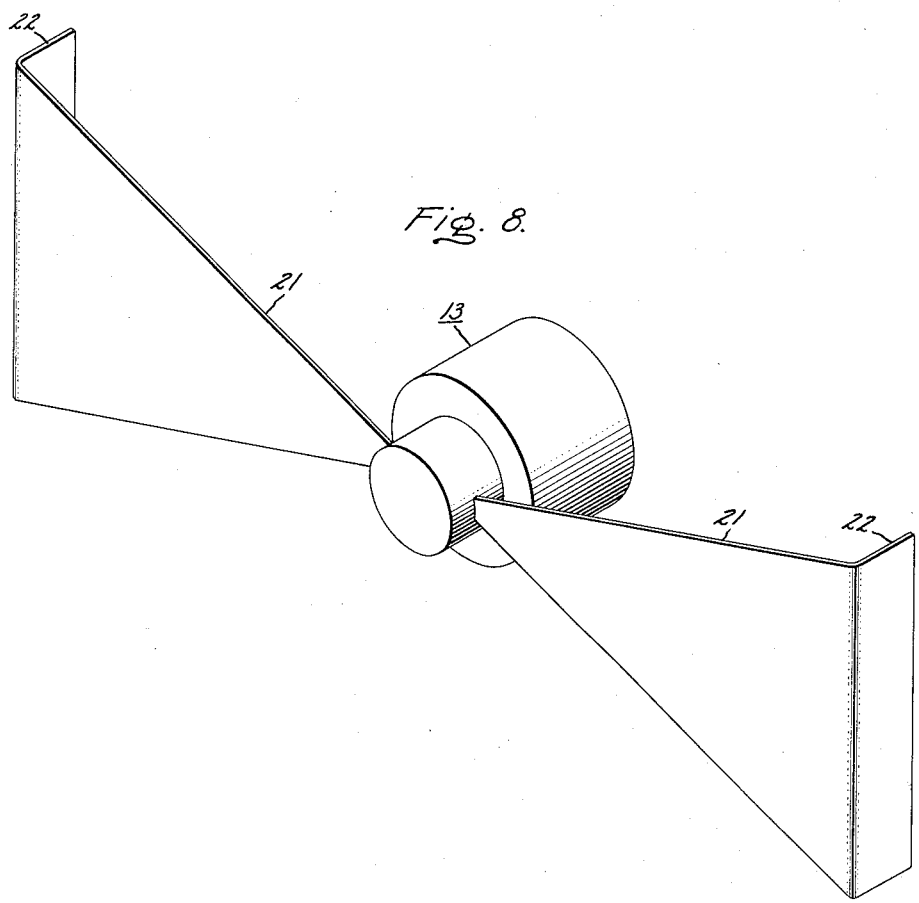

United States Patent Office 2,969,473
Patented Jan. 24, 1961

2,969,473

CORDLESS ELECTRIC CLOCKS

George L. de Wolf, Framingham Center, and Ira A. Terry, Ashland, Mass., assignors to General Electric Company, a corporation of New York Filed Dec. 31, 1958, Ser. No. 784,334

7 Claims. (Cl. 310—191)

The present invention relates to electric motors and, more particularly, to clock motors and to clocks the operation of which is responsive to a remote electric power source without electric wires or other direct connection with the source of power.

The invention provides an electric motor which is operated solely by a power source located at a distance from the motor without connecting cord and without amplifying circuits, batteries or other supplemental power supply.

More particularly, the rotor of the motor is supplied flux from remote energized power coils by flux collectors which, together with the rotor, are remote from the coils.

In accordance with the invention, the coils or other source of flux is located outside of the clock case or housing, as, for example, beneath a supporting shelf or table or in back of a supporting wall, so that the clock may be moved without moving or otherwise disturbing the flux transmitter.

In a preferred embodiment of the invention, the flux collectors do not extend through or even into the power transmitter coils. Although located outside the flux transmitter coils, the collectors gather and concentrate flux at the rotor.

Preferably, the collectors are positioned close to the rotor and are constructed of materials selected for their flux gathering property, so as to permit maximum spacing of the rotor and flux collectors from the transmitter.

Collectors in the form of ferrite rods of oval, round, rectangle and other cross-section have proved satisfactory. Steel and ferrite bow-tie collectors also have proved superior.

The novel features of the invention, together with objects and advantages thereof, will become readily apparent when considered in connection with the following description of the illustrative embodiments shown in the accompanying drawings in which:

Fig. 2 is a perspective view partially broken away of clock mechanism including flux collectors and permanent magnet rotor unit embodying the invention;

Fig. 3 is a rear elevation view of a table or mantle clock with a flux transmitter located beneath a table and showing the transmitted lines of flux to collectors in the clock located on the table;

Fig. 4 is an enlarged view in cross-section of the transmitter shown in Fig. 3;

Fig. 5 is an enlarged view partly broken away in cross-section of the flux collectors and rotor unit shown in Fig. 3;

Fig. 6 is an end view of the flux collectors and rotor shown in Fig. 5;

Fig. 7 is an enlarged cross-section view taken on line 7—7 of Fig. 5; and

Fig. 8 is a perspective view of a "bow-tie" flux collector and rotor assembly.

Figure 1:
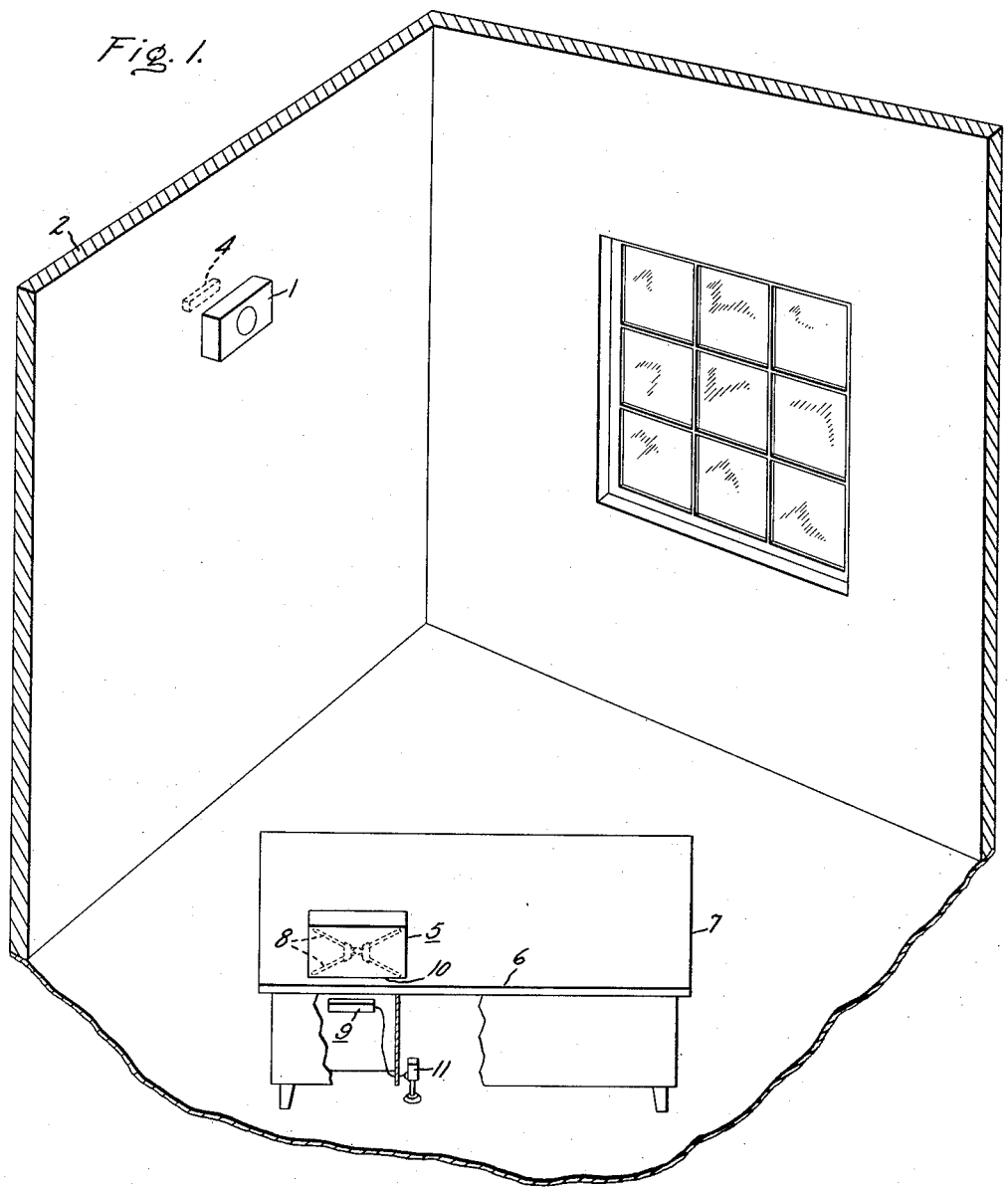
Fig. 1 is a diagrammatic sketch of a portion of a conventional room showing two cordless flux collector clocks located to receive power driving flux from a flux transmitter remote from the clock.

Referring to Fig. 1 of the drawings, there is illustrated a cordless clock 1 mounted on the wall 2 of a conventional room. Behind the clock 1 and the portion of the wall 2 on which the clock is mounted is a flux transmitter which is generally designated 4.

A second cordless clock 5 is shown above the table surface 6 of a "hi-fi" unit or other appropriate piece of furniture 7 located in the room. Flux collector elements 8 are shown by dotted lines within the clock 5, and a flux transmitter unit 9 is located beneath and separate from the collector elements 8 by the table top 6 and by the bottom 10 of the casing of the clock 5.

As shown in Fig. 1, the transmitter 9 is connected through an appropriate floor receptacle 11 to a suitable source of current, such as the 60 cycle power supply in general use in homes today.

In the embodiments shown in Figs. 1 and 3, four collectors 8 converge radially from the corners of the clock 5 to a centrally located rotor 12 of a clock motor generally designated 13.

Lines of flux shown by broken lines 14 emanate from the transmitter 9 through the table top 6 and the clock casing 15. The flux lines 14 are collected by the collector rods 8 and concentrated on the rotor 12 by the tips 16 of the collector rods.

The coil 17 and core 18 of the transmitter 9 shown in Fig. 4 may be of conventional construction. A transmitter having about 1000 ampere turns will operate a clock motor 13 which requires 1 to 2 ampere turns to run. The range of clocks embodying the invention from the transmitter can be increased by increasing the ampere turns of the transmitter or by decreasing the ampere-turn requirements of the motor.

The radially arranged collector rods 8 are illustrative of a variety of arrangements and forms suitable for collectors in various embodiments of the invention. Ferrite and transformer steel are two examples of readily available materials for the collector rods which have proved satisfactory in a variety of lengths and sizes, and in various cross-sectional shapes, such as elliptical and round.

The radial arrangement for the rods 8 shown in Figs. 3, 5 and 6 illustrates the collector principle and provides superior results when the transmitter 9 is located parallel to the horizontal axis of the clock.

As shown in Fig. 3, the dotted extension 19 is the only one of the illustrated flux lines in Fig. 3 which would act on the rotor 12 if the collector rods 8 were not there. However, it is apparent from Fig. 3 that the collectors 8 funnel and concentrate the flux lines 14 from a wide area into the rotor 12 by providing lower reluctance paths than the ambient.

The flux paths are shown in one plane and for only one half their effective path in that plane and critical area. Actually, of course, the paths are three-dimensional and, when undisturbed, take the form of a doughnut with the core as center and with the concentration decreasing away from the core. A collector system which funnels and concentrates more flux from a larger cross-sectional area can be located at a greater distance from the flux transmitter.

Also, a transmitter which directs more flux into the collector system improves the spacing range of the collector and transmitter.

The modified collector arrangement shown in Fig. 8 consists of a pair of generally triangular members 21, 21 which converge at the motor 13 in the general arrangement and shape of a bow-tie. Bent portions 22, 22 at the outer and wider end of the members 21 provide end surface for greater three-dimensional collecting effectiveness.

Clocks with collectors such as 8 and 21 have been successfully operated at distances of one to two feet and more from transmitters which in turn may be separated by walls, table tops, clock cases and other intervening structures from the synchronous motors of clocks embodying the invention.

The motor, generally designated 13 in the drawings, preferably may be a synchronous motor such as the low power unit described in application Serial No. 561,289, now Patent No. 2,792,510, filed January 25, 1956 by George de Wolf and assigned to General Electric Company, the assignee of the present invention. The details of the motor are not critical, and various units may be used. That shown more particularly in Figs. 5–7 includes a dielectric housing 23 which evenly spaces the collector tips 16 from the permanent magnet rotor 12. In practice, spacing of the order of 1/3 to 5/8 inches have been particularly satisfactory.

As shown in Fig. 7, the rotor 12 is secured to motor shaft 24, one end of which is journalled in a low-friction bearing generally designated 25, which is mounted within the housing 23.

The collectors 8, as illustrated in Figs. 5 and 6, may be held in their proper positions by clamps 26 which are tightened and fastened by screws 27 to the clock frame 28.

Preferably, the clamps 26 are formed of aluminum or other non-magnetic material so as not to weaken the flux collecting function of the rods 8.

The output shaft 29 of the synchronous motor 13 may drive the hands 30, 31 and 32 of a clock through a conventional gear and pinion movement such as that generally designated 33 in Fig. 2. Preferably, the movement includes a set and start shaft 34 with which the clock may be manually set and also started when the available flux is sufficient to maintain but not start the movement.

It will be apparent that the present invention provides a clock in which a flux collector unit associated with a permanent magnet rotor is physically separated from the flux creating unit. The separating may be by wall, table top, clock case or any or all of them. The flux creating emitter and the power supply line to it do not enter or lie within the clock casing.

The transmitter normally will be a 60 cycle unit, but, of course, may be a different frequency.

While there have been shown and described particular embodiments of the invention, it will be obvious to those skilled in the art that various changes and modifications can be made herein without departing from the invention, the scope of which is defined by the appended claims and includes all such changes and modifications falling within the claims.

We claim:

1. The combination in a clock having a magnetic rotor unit housed within a case for the clock, a flux collector unit located entirely within said case and associated with said rotor, and a flux transmitter located entirely outside of and separated from said case.

2. The combination recited in claim 1 and wherein said flux transmitter includes a plurality of energized coils and said collector unit includes a plurality of flux-gathering members which are located outside of and remote from said coils.

3. The combination recited in claim 2 and wherein said members converge toward the magnetic rotor.

4. The combination recited in claim 2 and wherein the flux collector members are ferrite rods which are bisymmetrically located about and converge toward the rotor which is centrally located relative to said rods.

5. The combination in an electric motor having a rotor and a flux collector unit remote from and excited by a flux transmitter the flux emanations from which directly drives the rotor.

6. The combination recited in claim 5 and wherein said flux transmitter is an energized coil and said collector unit is located outside and remote from said coil.

7. In an electric motor, a rotor, and a plurality of ferrite rods to derive an alternating current signal voltage from an alternating electric field having a source located away from and separated from said rods, said rods being located about said rotor and converging toward said rotor whereby said ferrite rods direct flux from the alternating electric field to the rotor to drive the rotor.

References Cited in the file of this patent
UNITED STATES PATENTS

| | | |
|---|---|---|
| 597,418 | Johnson | Jan. 18, 1898 |
| 996,253 | Johnson | June 27, 1911 |
| 1,072,647 | Piper | Sept. 9, 1913 |